United States Patent Office 3,442,855
Patented May 6, 1969

3,442,855
CUPROUS SALT-AMINE CATALYZED PHENOL POLYMERIZATION IN PRESENCE OF ALKALI METAL PHENOLATE
Mohamed Roshdy Ismail, Troisdorf, Germany, assignor to Dynamit Nobel AG, Troisdorf, Germany, a corporation of Germany
No Drawing. Filed July 6, 1966, Ser. No. 563,048
Claims priority, application Germany, July 16, 1966, D 47,736
Int. Cl. C08g 23/18
U.S. Cl. 260—47    7 Claims

ABSTRACT OF THE DISCLOSURE

Improvement in the process of producing polyphenylene oxides by the oxidative coupling of phenols in the presence of copper-ammonium complexes and the use of alkali metal phenolates in combination with the copper amine complexes.

This invention relates to the production of polyphenylene oxides. It more particularly refers to an improved process for the production of polyphenylene oxides.

Polyphenylene oxide polymers are known thermoplastic materials which have very desirable mechanical and electrical properties, have heat distortion temperature values of about 200° C. or higher and exhibit good resistance to both acids and alkalis.

These polymers have been produced in the past by the oxidative coupling of ortho-substituted phenols by reaction of the phenol with oxygen or an oxidizing agent in the presence of cuprous salts and primary or secondary amines.

It is an object of this invention to provide an improved process for the production of phenylene oxide polymers.

It is another object of this invention to provide a novel process for the production of phenylene oxide polymers which is more economical than prior art processes.

Other and additional objects of this invention will become apparent from a consideration of this entire specification including the claims appended hereto.

In accord with and fulfilling these objects, this invention includes, as one of its aspects, the improved process for the production of phenylene oxide polymers which comprises oxidative coupling of ortho-substituted phenols with an oxidizing agent in the presence of a cuprous salt and amine, and in addition in the presence of an alkali metal phenolate.

Ortho-substituted phenols which are useful in this invention are exemplified by compounds in accord with the general formula:

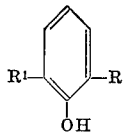

wherein R and R¹ may be the same or different and are monovalent radicals of the hydrocarbon, hydrocarbon oxy, halo hydrocarbon or halo hydrocarbon oxy type. The hydrocarbon groups may be alkyl or aryl residues. Where halo aryl type substituents are present, it is preferred that the halogen atoms are substituted directly on the aromatic ring.

Typical examples of compounds which satisfy the above general formula are: 2,6-dimethylphenol, 2,6-diethylphenol, 2,6-dibutylphenol, 2,6-dilaurylphenol, 2,6-dipropylphenol, 2,6-diphenylphenol, 2-methyl-6-ethylphenol, 2-methyl-7-propargylphenol, 2-methyl-6-cyclohexylphenol, 2-methyl-6-benzylphenol, 2-methyl-6-tolylphenol, 2-methyl-6-methoxyphenol, 2-ethyl-6-phenylethylphenol, 2,6-dimethoxyphenol, 2,6-diethylphenol, 2-methoxy-6-ethoxyphenol, 2-ethyl-6-stearyloxyphenol, 2,6-di(chlorethyl)-phenol, 2-methyl-6-isobutylphenol, 2-methyl-6-phenylphenol, 2,6-dibenzylphenol, 2,6-ditolylphenol and 2,6-di-(chlorpropyl)-phenol.

Cuprous salts which are useful in the practice of this invention and which are known to this art include: cuprous chloride, cuprous bromide, cuprous sulfate, cuprous azide, cuprous tetraminesulfate, cuprous acetate, cuprous propionate, cuprous palmitate, cuprous benzoate and the like.

Amines which are useful in the practice of this invention include aliphatic and aromatic or heterocyclic amines of the primary, secondary or tertiary class. These known materials are exemplified by pyridine, pyrrol, imidazol, morpholine or their derivatives, diethylamine, dimethylamine, isopropylamine, benzylamine, tertiary butylamine and the like.

It is often the case that polymerization solvents have been found to be useful in the production of polyphenylene oxide polymers. In such cases as their use is indicated, these solvents may be alcohols, ketones, hydrocarbons, chlorinated hydrocarbons, nitrohydrocarbons, ethers, ethers, amides or sulfoxides all of which are known in this art.

The oxidizing agent is suitably oxygen or an oxygen-containing gas, such as for example, air, oxygen-enriched air or oxygen diluted with an inert gas such as nitrogen, argon, etc.

The process of this invention is generally carried out under mild temperature conditions, such as for example, about 30 to 40° C. and under vacuum, atmospheric or elevated presure conditions as desired.

In accord with the practice of this invention, an alkali metal phenolate is added to the polymerization reaction mixture which acts to accelerate the polymerization reaction. It is preferred to use about 0.1 to 1.0 mole percent of alkali metal phenolate based upon the ortho-substituted phenol in the polymerization reaction mixture. It has been found most preferable to utilize about 0.25 to 0.6 mole percent alkali metal phenolate.

Alkali metal phenolates for use in this invention can be prepared by known techniques, such as for example, by reacting an appropriate phenol with an alkali metal hydroxide, amide, hydride, alcoholate or other suitable derivative. The particular alkali metal phenolate used is not considered to be crtical to the practice of this invention however, it is preferred, for ease of purification of product and other reasons, to utilize as the alkali metal phenolate a compound whose phenol residue is the same as the phenol being polymerized. In this regard, it may in some cases be practical, to form the alkali metal phenolate in situ by merely adding appropriate alkali metal contributing compound, as set forth above, to the polymerization reaction mixture.

It has been found that by polymerizing orth-substituted phenols in the presence of alkali metal phenolate according to this invention, the rate of polymerization is markedly increased and the degree of polymerization is also substantially increase. The following table shows comparative polymerizations carried out under identical condition with and without added alkali metal phenolate. The monomer was 24.4 grams of 2,6-dimethyl phenol, the solvent was 160 ml. of chloroform, the catalyst was 30 ml. of pyridine and 0.432 gram of cuprous chloride and the alkali metal phenolate, where used, was 0.12 gram of sodium phenolate.

TABLE I

| Time in minutes | Reduced viscosity with Na-phenolate | Reduced viscosity without addition |
|---|---|---|
| 15 | 0.24 | |
| 30 | 0.75 | |
| 45 | 1.47 | 0.10 |
| 60 | 2.22 | 0.70 |
| 90 | | 1.20 |
| 120 | | 1.60 |

The following table shows another comparative polymerization. In these tests the monomer was 10 gms. of 2,6-dimethylphenol, the solvent was 90 ml. of toluene and 50 ml. of isopropanol, the catalyst was 0.25 gm. of cuprous chloride and 0.73 gm. of diethylamine and the phenolate, where used, was 0.06 gm. of sodium 2,6-dimethylphenolate.

TABLE II

| Time in minutes | Reduced viscosity without addition | Reduced viscosity with sodium phenolate |
|---|---|---|
| 50 | 0.32 | 0.49 |
| 70 | 0.49 | 0.68 |
| 90 | 0.56 | 0.76 |
| 110 | 0.79 | |

It has additionally been discovered that, where alkali metal phenolates are used as polymerization accelerators, it is practical to reduce the amount of cuprous salt needed to catalyze the polymerization. Thus, for example, up to about 50 weight percent of the cuprous salt can be replaced by as little as 0.27 mole percent of phenolate.

This manner of opreation is of great importance since in this way large quantities of cuprous catalyst can be saved. The subsequent removal of the catalyst is also substantially simpler as well as the further processing. As complete as possible a removal of the copper catalyst is necessary in order to obtain products having better properties with respect to resistance to oxidation and light as well as color. Furthermore, the phenolates which remain can easily be scrubbed out of the polymers.

Table III below shows comparison polymerizations with varying proportions of cuprous salt in the polymerization reaction mass. In these polymerizations 170 ml. of dichloroethane was the solvent, 24.4 gms. of 2,6-dimethylphenol was the monomer, 15 ml. of pyridine was the cocatalyst and 0.06 gm. of sodium-2,6-dimethylphenolate was the accelerator.

TABLE III

| | Reduced viscosity | | | |
|---|---|---|---|---|
| Time in minutes | 0.216 g. CuCl without phenolate | 0.166 g. CuCl with phenolate | 0.137 g. CuCl with phenolate | 0.108 g. CuCl with phenolate |
| 60 | 0.10 | 0.23 | 0.07 | |
| 80 | 0.18 | 0.32 | 0.37 | 0.21 |
| 100 | 0.42 | 0.55 | 0.49 | 0.46 |
| 120 | 0.91 | 1.00 | 0.53 | 0.51 |
| 140 | | | 0.86 | 0.64 |

The following examples are given by way of illustration of the instant invention without in any way being limiting thereon.

EXAMPLE 1

Batch:
| | | |
|---|---|---|
| CuCl | g | 0.432 |
| Pyridine | ml | 30 |
| 2,6-dimethylphenol (DMP) | g | 24.4 |
| Chloroform | ml | 160 |
| 2,6-dimethyl-sodium-phenolate | g | 0.06 |

Procedure

The experiment is carried out at a constant temperature of 30° C. 30 ml. of pyridine and 160 ml. of chloroform are introduced into a 250 ml. 4-neck flask provided with agitator, condenser, thermometer and feed tube. Thereupon, 0.432 gm. of CuCl are introduced and oxygen is fed in. The solution passes from light green within 2 to 3 minutes into a dark green. After about 5 minutes, about 5 g. of DMP and 0.06 g. Na-phenolate are added, and then the remaining DMP is added. After about 7 minutes the solution acquires an orange-brown color and the temperature rises within 20 minutes to about 40° C. The polymer is precipitated with methanol and dried in vacuum at 110° C. The reduced viscosity in chloroform is 0.24 after 15 minutes and 0.75 after 30 minutes.

Yield: about 91%.

EXAMPLE 2

Batch:
| | | |
|---|---|---|
| Solvent | ml | 120.0 |
| Diethylamine | g | 0.73 |
| CuCl | g | 0.25 |
| Solvent | ml | 20.0 |
| 2,6-dimethylphenol (DMP) | g | 10.0 |
| 2,6-dimethyl-sodium-phenolate | g | 0.06 |

Procedure 120 ml. of solvent consisting of 90 ml. toluene and 50 ml. isopropanol, 0.73 g. diethylamine and 0.25 g. CuCl are introduced into a 250 ml. 4-neck flask provided with agitator, thermometer, reflux condenser and feed tube at 30° C. Oxygen is introduced for 20 minutes and a solution of 20 ml. of solvent and 10 g. 2,6-dimethylphenol is added.

At given time intervals samples (10 to 15 ml.) are taken, precipitated with about 200 ml. methanol, filtered off and dried at 110° C. in vacuum for about 3 hours. The reduced viscosity is measured in chloroform and after 50 minutes is 0.49.

Yield: about 90%.

EXAMPLE 3

Batch:
| | | |
|---|---|---|
| CuCl | g | 0.206 |
| Pyridine | ml | 22.5 |
| 2,6-dimethylphenol | g | 36.6 |
| Dichlorethane | ml | 255 |
| 2-N-caustic soda solution | ml | 0.3 |

Procedure

The experiment is carried out at a temperature of 30° C. 22.5 ml. of pyridine and 255 ml. of dichlorethane are introduced into a 500 ml. 4-neck flask provided with agitator, condenser, thermomenter and feed tube. Thereupon 0.206 g. CuCl are added and oxygen is introduced. The solution passes from a light green within 2 to 3 minutes into a dark green. After about 5 minutes, a mixture of 36.6 g. of 2,6-dimethylphenol and 0.3 ml. 2 N caustic soda solution is added; after about 120 minutes the polymer is precipitated with methanol and dried in vacuum at 110° C.

The reduced viscosity in chloroform is 0.61 at the end of 120 minutes. An experiment with 0.09 g. DMP-sodium phenolate which was carried out under the same conditions gave a reduced viscosity of 0.57.

Yield: about 90%.

What is claimed is:

1. In the process for the production of polyphenylene oxides by the polymerization of an ortho-substituted phenol in the presence of a cuprous salt-amine catalyst; the improvement which comprises carrying out said polymerization in the presence of about 0.1 to 1.0 mole percent, based upon the phenol being polymerized, of an alkali metal phenolate.

2. The improved process claimed in claim 1, wherein said phenolate has a phenol moiety identical with the phenol being polymerized.

3. The improved process claimed in claim 1, wherein said phenolate is present in proportion of about 0.25 to 0.6 mole percent based upon the phenol being polymerized.

4. The improved process claimed in claim 1, wherein said cuprous salt is at least one member selected from the group consisting of cuprous chloride, cuprous bromide, cuprous sulfate, cuprous azide, cuprous tetraminesulfate, cuprous acetate, cuprous propionate, cuprous palmitate and cuprous benzoate.

5. The improved process claimed in claim 1, wherein said amine is at least one selected from the group consisting of pyridine, pyrrol, imidazol, morpholine or their derivates.

6. The improved process claimed in claim 1, wherein said phenol is at least one selected from the group consisting of 2,6-dimethylphenol, 2,6-diethylphenol, 2,6-dibutylphenol, 2,6-dilaurylphenol, 2,6-dipropylphenol, 2,6-diphenylphenol, 2-methyl-6-ethylphenol, 2-methyl - 7 - propargylphenol, 2-methyl-6-ethylphenol, 2-methyl - 7 - propargylphenol, 2-methyl-6-cyclohexylphenol, 2-methyl-6-benzyl-phenol, 2-methyl-6-tolylphenol, 2-methyl-6-methoxyphenol, 2-ethyl-6-phenylethylphenol, 2,6-dimethoxyphenol, 2,6 - diethylphenol, 2-methoxy - 6 - ethoxyphenol, 2-ethyl-6-stearyloxyphenol, 2,6-di-(chlorethyl)-phenol, 2-methyl-6-isobutylphenol, 2-methyl-6-phenylphenol, 2,6-dibenzylphenol, 2,6-ditolylphenol and 2,6-di-(chlorpropyl)-phenol.

7. The improved process claimed in claim 1, wherein said process is carried out at about 30 to 40° C.

References Cited

UNITED STATES PATENTS

| 3,306,874 | 2/1967 | Hay | 260—47 |
| 3,306,875 | 2/1967 | Hay | 260—47 |

WILLIAM H. SHORT, *Primary Examiner.*

M. GOLDSTEIN, *Assistant Examiner.*